United States Patent [19]
Anderson

[11] Patent Number: 5,922,041
[45] Date of Patent: Jul. 13, 1999

[54] NAVIGATION SIMULATOR AND RECORDER

[75] Inventor: Eric G. Anderson, Rochester Hills, Mich.

[73] Assignee: Magellan DIS, Inc., Rochester Hills, Mich.

[21] Appl. No.: 08/710,473

[22] Filed: Sep. 18, 1996

[51] Int. Cl.⁶ .................................................. G06F 19/00
[52] U.S. Cl. ........................................... 701/200; 701/35
[58] Field of Search .................................. 701/200, 202, 701/29, 35, 213, 217; 340/438, 439, 990, 995, 988

[56] References Cited

U.S. PATENT DOCUMENTS

| | | | |
|---|---|---|---|
| 4,258,421 | 3/1981 | Juhasz et al. ............................. | 701/35 |
| 4,827,438 | 5/1989 | Nickles et al. ............................. | 701/35 |
| 5,307,290 | 4/1994 | Raviglione et al. ....................... | 701/29 |
| 5,557,524 | 9/1996 | Maki ......................................... | 701/35 |
| 5,719,771 | 2/1998 | Buck et al. ............................... | 701/35 |
| 5,777,875 | 7/1998 | Miyano .................................... | 701/211 |
| 5,828,321 | 10/1998 | Matsuzaki ................................. | 701/35 |

*Primary Examiner*—Gary Chin
*Attorney, Agent, or Firm*—Howard & Howard

[57] ABSTRACT

A navigation simulator and recorder includes a computer and several position and attitude determining devices installed in a vehicle driven along a test route. The data from the position and attitude determining devices is stored in the computer while the vehicle is driven along the test route. The recorded data from the test drive is subsequently utilized to test a navigation system. The output of the navigation system under test is monitored to determine its response to the real time recorded data.

19 Claims, 1 Drawing Sheet

NAVIGATION SIMULATOR AND RECORDER

BACKGROUND OF THE INVENTION

This invention relates generally to navigation systems and more particularly to a system for testing a navigation system utilizing real-time data gathered during an actual test drive.

During development and testing of a navigation system, it is currently necessary to install the navigation system in a vehicle and drive an actual route in order to verify the operation of the system. During development of a single system, numerous time-consuming test drives are required, thereby lengthening the development and testing of the system. Numerous test drives may be required just to verify a certain algorithm. Ideally, the test conditions during testing would be identical for each test performed. However, an actual test drive can never be exactly the same. Even if the vehicle is driven along the same route, different weather conditions, different drivers, traffic lights and traffic conditions will result in very different test conditions. More importantly, variations in the positions of the satellites may greatly affect the operation of a particular navigation system but would vary between repetitions of the test. Further, there are unique driving conditions in different areas of the country that would be handled differently by the software. For example, in Michigan, there are "Michigan left turns" i.e. in order to turn left at an intersection, the driver is required to turn right and then turn 180° around a boulevard. Another example is the rotaries in Boston. It is important to test the response of the navigation system to these maneuvers: however, repeatedly going to these various areas of the country to verify the software is costly and time consuming. Further, it is important to test the navigation system in different geographic locations in order to test the response of the navigation system to different geographic locations relative to the position of the satellites.

SUMMARY OF THE INVENTION

The present invention provides a system and method for testing navigation system utilizing actual navigation system input signals received while traveling an actual route.

Generally, the invention records data gathered during an actual test drive and uses that recorded data in a simulator for a navigation system. The recorded data from the test allows one to check whether the solutions provided by the navigation system are accurate given real world variations. The solutions are then compared to the known test drive route for accuracy.

The navigation recorder and simulator of the present invention includes a recording system having position and attitude determining devices mounted on a vehicle, as would be utilized in a navigation system installed on a vehicle. The output data from these position and attitude determining devices is stored on a computer in the vehicle during the test drive. After traveling the test route the navigation input signals stored in the computer are utilized to test a navigation system.

In a first embodiment, the raw recorded navigation system input signals are played back to the navigation system just as they were received by the recording system during the test drive. The output from the navigation system under test is monitored to determine whether it correctly interpreted the navigation system input signals, including correctly adjusting for erroneous signals and anomalies.

In a second embodiment, the recorded raw data is utilized to compute and record as accurately as possible the true position of the vehicle as it travels along the test route. The calculated position data is subsequently utilized to generate simulated position- and attitude-determining device input signals, which are fed into the navigation system under test. The simulated input signals are sent to the navigation system generally in one of three forms. First, the simulated input signals may represent ideal input signals which would be generated by ideal position and attitude determining devices while the vehicle travels along the test route. Second, the simulated input signals may be modified in order to recreate the situation actually encountered by the recording system along the test route, such as anomalies and discrepancies among the input signals. Third, the simulated input signals may be modified to create artificial aberrations to test the navigation system's response to adverse or worst-case situations.

BRIEF DESCRIPTION OF THE DRAWINGS

The above, as well as other advantages of the present invention, will become readily apparent to those skilled in the art from the following detailed description of a preferred embodiment when considered in light of the accompanying drawings in which.

DETAILED DESCRIPTION OF A PREFERRED EMBODIMENT

Figure 1:
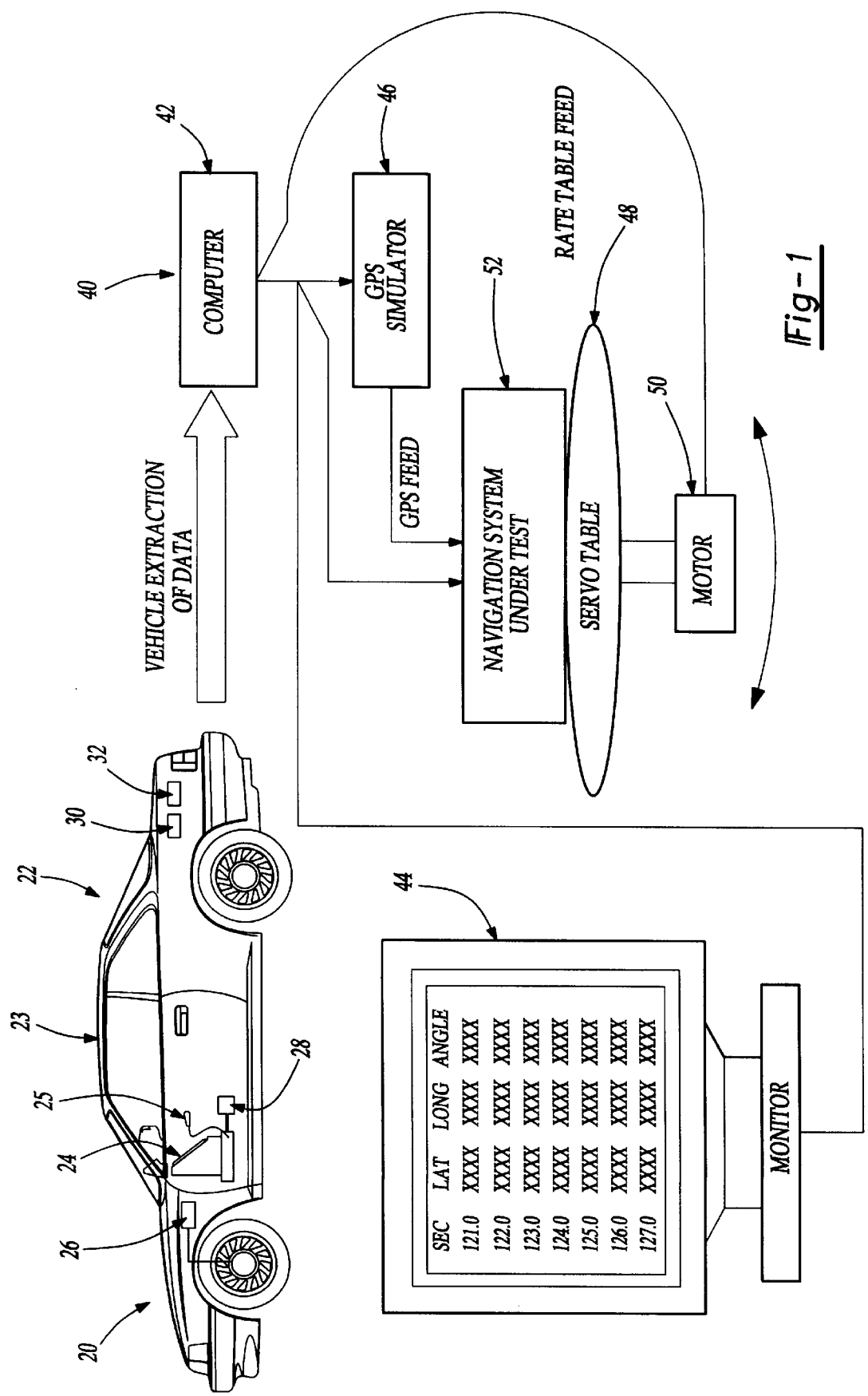
FIG. 1 is a schematic of a navigation simulator and recorder in accordance with the present invention.

The navigation simulator and recorder 20 of the present invention is shown in FIG. 1. The navigation simulator and recorder 20 includes a recording system 22 installed in a vehicle 23. The recording system 22 comprises a computer 24 having a user input device 25 and various position and attitude determining devices such as a wheel speed sensor 26, a digital compass 28, a differential GPS receiver 30 and a gyro 32, all connected to the computer 24 (connections not shown for clarity).

The navigation simulator and recorder 20 further includes a playback system 40 including a computer 42 having a monitor 44, a GPS simulator 46, and a servo table 48 driven by a motor 50. The computer 42 and monitor 44 may be the computer 24 of the recording system 22.

The computer 24 is preferably a ruggedized portable computer having a CPU which is at least a 66 MHz Intel 486 DX2 microprocessor. A 486 DX4 100 MHz or Pentium microprocessor system is preferable. The computer 24 should include 2 vacant ISA 16 bit expansion slots. The computer 24 preferably has a battery capable of supplying power to the computer for at least 5 hours or includes a converter to connecting to the automobiles 12 VDC system. The computer 24 preferably includes 2 serial ports and 1 parallel port and at least 1–3.5" 1.44 MB floppy disk drive. The user input device 25 preferably include s a keyboard or mouse; however, an additional external keyboard input port is preferable, particularly if the computer 24 will also be utilized in the playback system 40. Similarly, the computer 24 preferably includes a 640×280 VGA color monitor; however, an external monitor output port is preferably, particularly if the computer 24 will also be utilized as the computer 42 in the play back system 40. The computer 24 preferably includes at least 4 Mbytes RAM and at least a 500 Mbytes ruggedized hard disk with a fast access time.

The wheel speed sensor 26 preferably allows calibration to 2, 4, 6, 8 thousand pulses per mile. The digital compass 28 preferably has a readout resolution of 1 degree and an output rate of 1 Hz minimum. The digital compass 28 preferably includes serial RS232 level data outputs.

The GPS receiver 30 preferably includes as a minimum 8 continuous L1 C/A hardware tracking channels. The output per channel at a minimum preferably provides 1 Hz data output rate.

The navigation solution data preferably consists of time (GPS or UTC), position, velocity, track angle (heading), GDOP/PDOP and solution and operability status flags. The GPS receiver 30 must further include the Ephemeris data for tracked satellites in high order format. The GPS receiver 30 preferably incorporates RTCM-104 differential corrections provided by Differential Correction Incorporated (DCI) or similar RTCm provider to provide accuracy within 5 meters or better. The GPS receiver 30 preferably includes a magnetic mount antenna/preamplifier/ground plain assembly. The GPS receiver 30 preferably outputs data via RS232.

The computer 24 further includes an AT expansion card consisting of a multi-input analog to digital sampler for converting the wheel speed sensor 26 data and gyro 32 data. The input signal range includes the wheel speed inputs consisting of input square wave from 2000–8000 pulses per mile. The input from the gyro 32 is +/−12 mvolt/deg/s superimposed on 5 VDC bias. Preferably a single expansion card capable of incorporating both analog inputs simultaneously with 10 Hz digital output available via dual ported r+/−RAM or accessible memory address is utilized.

Preferably, the computer 24 records raw sensor data in as primitive format as possible in order to record conditions as they existed in the field as accurately as possible. Although the computer 24 transforms the raw sensor data to a useable output format consistent with LSB, finite recording rates, etc., it does not change the data in any systematic manner. Although calibration is not be performed on the recorded raw data, the difference data is computed and recorded to facilitate post processing analysis of the raw data and aid in subsequent calibration studies to be performed on analysis software. In some cases, calibration is applied to the displays shown on the computer monitor; however, calibration is not applied to the recorded sensor data. The error between the GPS based track angle, obtained from the output of the GPS receiver 30, and the digital compass 28 is obtained and logged at 1 Hz and displayed on the monitor of the computer 24. The error between the analog based rate sensor and the digital compass is computed and logged at a rate equal to the output of the digital compass, preferably 5 Hz. The monitor on computer 24 displays this difference value. In the absence of GPS heading information, the rate sensor will provide the primary heading output, in this case the output (but not raw value) will incorporate the current calibration value. The difference between the vehicle speed based upon the wheel speed sensor 26 and the GPS speed, as obtained from the output of the GPS receiver 30, is maintained and logged at 1 Hz.

The initialization data, including the values used for initializing the GPS sensor 30 and computer 24, and the data recording log initial start time, are recorded. The start time is used to reset the PC system clock in the computer 24 such that such good time keeping will be maintained relative to this time.

The GPS sensor data is also logged, including system status, number of tracked satellites at time epoch for_num_ tracked_satellites {svid, C/No, flags, pseudoirange, pseudorange rate, DGPS correction}. The GPS sensor data is logged as fast as output from the GPS sensor, preferably not to exceed 1 Hz. System status identifies the current navigation status (2D/3D, nav, DGPS incorporation).

The digital compass data, including compass based heading, is logged as fast as supported by the compass but preferably not less than 1 Hz or faster than 10 Hz. An initial header record identifies the test data session identifier, initial start time, and miscellaneous configuration data.

The gyro 32 outputs are preferably sampled at 10 Hz and stored incrementally, rather than time tagged. The data file includes the sampled vehicle rate, and the computed track angle based upon the rate. An initial header record identifies the test data session identifier, initial start time, and miscellaneous configuration data. If the compass does not support 10 Hz, then the compass based track angle is frozen between compass updates.

The data from the wheel speed sensor 26 is stored incrementally, rather than in time tagged format. The data includes accumulated pulse counts over the increment interval, which is preferably 0.1 seconds as determined from the clock in the computer 24. The wheel speed sensor 26 data would include the accumulated pulses over 0.1 seconds and the derived current vehicle speed based upon the pulse count data.

The calibration or difference data amongst the various sensors is preferably recorded at 1 Hz. This record would include the difference between the compass and rate based derived track angle, the difference between the GPS and the wheel speed derived vehicle speed, the difference between the GPS and the compass heading, and the difference between the GPS time and the computer based time at data epoch. The sensor calibration file includes an initial header record and will be logged at 1 Hz. The computer, 24 and GPS 30 based time will not be coincident because the GPS 1 PPS output is not sampled based upon the clock in the computer 24. The difference includes a bias which is monitored for drift.

The vehicle 23 is driven on a test drive while the computer 24 logs the data from the position and attitude determining devices as described above. The data is preferably stored to the computers hard drive; however, it should be recognized that the data could also be stored in RAM, on tape drives, optical disks or any data storage device.

Preferably, the recording system 22 calculates its true position in real time on computer 24 as it receives the raw input signals from the position and attitude determining devices. Alternatively, the computer 42 in the playback system 40 can calculate the true position using the previously recorded data. The true position of the vehicle 23 travelling the test route is calculated as accurately as possible. Preferably, the primary device utilized is the differential GPS receiver 30. Because the differential GPS data is received at only 1 Hz, the position between GPS position calculations is calculated using the gyro 32, digital compass 28 and wheel speed sensor 26. Further, because the differential GPS is accurate to only 5 meters, the position of the vehicle is "smoothed" utilizing information from the gyro 32, digital compass 28 and wheel speed sensor 26.

The computer 42 preferably creates simulated input signals from the position and attitude determining devices based upon the calculated position data. Simulated input signals would represent "ideal" input signals which would be generated by perfect input devices travelling according to the calculated position data. The computer 42 then contains both the raw data from the position and attitude determining devices gathered during the test drive and the "ideal" simulated input signals.

The simulated signals can be modified based upon the stored raw data, including erroneous signals and discrepancies among the input signals, in order to re-create the environment that existed during the recording of the test route. Alternatively, the simulated signals can be modified to artificially create adverse or different conditions, such as inaccurate sensors, different satellite positions, different signal strengths from the satellites, etc.

The computer 42 sends the simulated data to the GPS simulator 46. The GPS simulator 46 is preferably a Welnavigate GPS simulator, which is currently commercially available. The GPS simulator 46 sends GPS feed signals to the navigation system under test 52 which reflect the signals which would be received by a GPS receiver travelling the test route, as potentially modified by the operator as described above. The recorded data from the other position and attitude determining devices can be connected directly from the computer to the navigation system under test 52; however, preferably, the data from the attitude determining devices, i.e. the compass 28 and gyro 32, in combination with the data from the GPS, is utilized to control a motor driving a servo table 48 on which the navigation system under test 52 is placed. The computer 42 then sends control signals to the motor 50 of the servo table 48 to mechanically simulate the attitude of the vehicle 23 during the test drive. In this manner, the sensors of the navigation system under test 52 can be tested.

During playback, the output from the navigation system under test 52 is monitored to determine the navigation system's ability to correctly navigate the simulated test drive, including response to "ideal" inputs, or input signals similar to the field test conditions, artificially created anomalies, or the actual signal environment experienced during the test drive of the vehicle 23. Preferably, the computer 42 is capable of single stepping forward and backward in the data files, running forward freely, and pausing, as selected by an operator.

In accordance with the provisions of the patent statutes, the present invention has been described in what is considered to represent its preferred embodiment. However, it should be noted that the invention can be practiced otherwise than as specifically illustrated as described without departing from its spirit or scope.

What is claimed is:

1. A method for testing a navigation system including the steps of:
    a) travelling a test path from a beginning geographic location to a destination geographic location;
    b) receiving input signals from at least one position-determining device while travelling said test path;
    c) storing said input signals while travelling said test path;
    d) utilizing said signals stored in said step c) as a simulated trip to test the navigation system;
    e) monitoring an output of said navigation system in response to said step d); and
    f) comparing said output to said test path to verify the operation of the navigation system.

2. The method for testing a navigation system according to claim 1 further including the steps of:
    calculating the test path of the vehicle based upon said input signals; and
    generating simulated input signals which would be received by the navigation system travelling said test path;
    sending said simulated input signals to said navigation system.

3. The method for testing a navigation system according to claim 2 further including the steps of:
    modifying said simulated signals before sending said simulated signals to said navigation system; and
    sending said modified simulated signals to said navigation system.

4. The method for testing a navigation system according to claim 2 further including the steps of:
    modifying said simulated signals based upon discrepancies in the input signals received while travelling said test path; and
    sending said modified simulated signals to said navigation system.

5. The method for testing a navigation system according to claim 2 further including the step of modifying said simulated signals to introduce discrepancies among said simulated input signals.

6. The method for testing a navigation system according to claim 1 further including the step of sending said stored signals to said navigation system.

7. The method for testing a navigation system according to claim 1 wherein said step b) further includes the step of receiving signals from a satellite positioning system.

8. The method for testing a navigation system according to claim 1 wherein said step b) further includes the step of receiving signals from a wheel speed sensor.

9. The method for testing a navigation system according to claim 1 wherein said step b) further includes the step of receiving signals from an attitude-determining device.

10. The method for testing a navigation system according to claim 1 further including the steps of:
    receiving input signals from a plurality of position-determining devices while travelling said test path;
    calculating discrepancies between said input signals from said plurality of position-determining devices; and
    storing said discrepancies.

11. The method for testing a navigation system according to claim 1 further including the steps of:
    in said step d), mechanically moving at least one position-determining device in the navigation system based upon said input signals.

12. A system for testing a navigation system including:
    at least one position-determining device generating position signals while traveling a test route;
    a data storage device for storing said position signals generated during said test route;
    a simulator for sending simulated input signals to the navigation system based upon said stored position signals;
    means for monitoring an output of the navigation system; and
    means for comparing the output to the test path to verify the operation of the navigation system.

13. The system for testing a navigation system according to claim 12 further including:
    a system for calculating the location of said at least one position determining device while traveling said route; and
    a system for generating said simulated input signals which would be received by the navigation system travelling said route, said simulated input signals generated based upon said location calculated by said system for calculating.

14. The system for testing a navigation system according to claim 12 further including:
    a system for selectively modifying said simulated input signals to introduce discrepancies among said simulated input signals.

15. The system for testing a navigation system according to claim 12 wherein said simulator sends said position signals to said navigation system.

16. The system of claim 12 wherein said at least one position-determining device comprises a wheel speed sensor.

17. The system of claim 12 wherein said at least one position-determining device comprises a GPS receiver.

18. A method for testing a navigation system including the steps of:
   a) inputting a plurality of pre-stored input signals representing input signals from a plurality of position-determining devices to the navigation system;
   b) simulating travel by the navigation system along a test path during said step a);
   c) monitoring an output of the navigation system in response to said steps a) and b); and
   d) comparing the output to the test path to verify the operation of the navigation system;
   e) before said step a), storing the input signals from the plurality of position-determining devices while travelling said test path.

19. The method of claim 18 wherein the plurality of input signals include discrepancies among said plurality of input signals, said method further including the step of inputting said discrepancies to said navigation system in said step a).

* * * * *